United States Patent [19]

Kronstein et al.

[11] Patent Number: 4,520,153
[45] Date of Patent: May 28, 1985

[54] PRODUCTION OF PAINT CONTAINING LECITHIN-TREATED METAL OXIDE

[75] Inventors: Max Kronstein, Riverdale, N.Y.; Joseph Eichberg, Atlanta, Ga.

[73] Assignee: American Lecithin Company, Atlanta, Ga.

[21] Appl. No.: 443,899

[22] Filed: Nov. 23, 1982

[51] Int. Cl.$^3$ .......................... C08K 5/52; C08K 5/56; C23F 11/10

[52] U.S. Cl. ............................. 524/145; 106/14.12; 106/14.25; 252/363.5; 252/389 R; 252/389.2; 260/403

[58] Field of Search ............... 252/389.2, 363.5; 106/14.12, 14.25; 260/403; 524/145

[56] References Cited

U.S. PATENT DOCUMENTS

| | | | |
|---|---|---|---|
| 2,244,416 | 6/1941 | Ashburn et al. | 252/389.2 X |
| 2,371,476 | 3/1945 | Sifferd | 260/403 |
| 2,997,398 | 8/1961 | Kronstein et al. | 106/14.36 |
| 3,068,111 | 12/1962 | Seymour | 106/177 |
| 4,056,494 | 11/1977 | Kronstein et al. | 106/243 |
| 4,094,801 | 6/1978 | Forsberg | 252/389.2 X |
| 4,126,591 | 11/1978 | Kronstein et al. | 524/17 |
| 4,305,853 | 12/1981 | Kronstein et al. | 260/403 X |

OTHER PUBLICATIONS

Wienand et al., "Recent Developments in Inorganic Anticorrosion Pigments", Modern Paint and Coatings, vol. 74, No. 11, Nov. 1984, pp. 3 and 42–46.

Kronstein: "Lecithin–Metaloxide Compositions in Corrosion Preventive Compounds", Modern Paint and Coatings, vol. 74, No. 7, Jul. 1984, pp. 31–39.

Organic Coatings and Plastics Chemistry vol. 41, American Chemical Society, Copyright 1979 by ACS, pp. 514–517.

Controlled Release of Polymeric Organometal Toxicants, 1981, 20, 5.

Primary Examiner—Richard D. Lovering
Attorney, Agent, or Firm—Fisher, Christen & Sabol

[57] ABSTRACT

A process which includes subjecting a composition of (a) solid or fluid, oil-carrying or oil-free lecithin materials and (b) metal oxides to mechanical treatment or mechanical impact, without the requirement of heat application to such composition. The reaction products of component (a) and component (b) have unique properties.

24 Claims, No Drawings

PRODUCTION OF PAINT CONTAINING LECITHIN-TREATED METAL OXIDE

BACKGROUND OF THIS INVENTION

1. Field of this Invention

This invention relates to the production of reaction products between solid or fluid, oil-carrying or oil-free lecithin materials with metal oxides, to the reaction products of such production processes and to the application of such reaction products.

2. Prior Art

In U.S. Pat. No. 4,305,853 Kronstein and Eichberg established that metal oxides can chemically be modified in forming their lecithin derivatives by heating them at temperatures between 100° and 160° C. for a period of at least ten minutes with a lecithin fluid or a lecithin fluid fraction, whereby thereafter a modified metal oxide, partially in a suspended form developed or partially dissolved in the fluid lecithin (claim 1 of such patent), is developed. The term "fluid lecithin" was defined in claim 3 of such patent as a lecithin which was present in an oily fraction or an acetone-soluble fraction, such as that obtained by mixing lecithin in its crude oil-carrier form with acetone, whereby an insoluble fraction was precipitated. So said oily fraction or acetone-soluble fraction was separated from the precipitated insoluble fraction. Claim 4 of such patent had pointed out that said fluid fraction could be used in the presence of another fluid, such as, a triglyceride oil diluent. The use of the acetone-insoluble fraction, which had been separated from an oily lecithin fraction, required a re-introduction of selected oily matter from the group of triglyceride oils, so as to become a component of said lecithin material, which was then used to treat added metal oxides (see claim 16 of the earlier patent).

Summarizing, U.S. Pat. No. 4,305,853 used for the modification of metal oxides lecithin materials containing crude oil-carrier lecithin or oil-free lecithin, after introducing triglyceride matter for the modification of the metal oxides, and required for the reaction of metal oxides with such lecithin matter, an exposure to temperatures above 100° and to 160° C. (preferably for between ten minutes and one hour or more).

BROAD DESCRIPTION OF THIS INVENTION

An object of this invention is to provide a process for the production of reaction products between solid or fluid, oil-carrying or oil-free lecithin materials with metal oxides without the requirement of heat application. Another object is to provide the reaction products of such process. A further object is to provide uses for such reaction products. Other objects and advantages of this invention are set out herein or are obvious herefrom to one ordinarily skilled in the art.

The objects and advantages of this invention are achieved by the production process, reaction products and uses of the latter of this invention.

This invention involves a process which includes subjecting a composition of (a) solid or fluid, oil-carrying or oil-free lecithin materials and (b) metal oxides to mechanical treatment or mechanical impact, without the requirement of heat appliction to such composition, whereby reaction products of component (a) and component (b) result.

This invention succeeds in modifying metal oxides with lecithins without heat application and using lecithin materials without requiring the presence of an oily fraction or oily additive. This invention succeeds in introducing the interreaction by replacing the use of heat energy with the application of mechanical energy or pressure, i.e., doing so without any heat requirement and applying such mechanical pressure at around room temperature. While earlier U.S. Pat. No. 4,305,853 utilized combinations of actual lecithin with oily matter, this invention requires no oily component and establishes, therefore, the modification of metal oxides with straight lecithin materials, even though the crude oil carrier lecithin can also be used without interfering with the process development. This invention accordingly uses the entire range of lecithins, that is, the solid purified lecithin as well as the oil-carrier lecithin. The solid lecithin can, in order to increase contact with the metal oxides, be dispersed in plain organic volatile solvents without requiring the addition of oily matter. The fact that the modification of metal oxides with lecithin materials is within the scope of this new invention, which is carried out without the application of heat, results in the production of products of lighter color which can be introduced in products also which have a lighter color and without changing such color, contrary to the case of heat-exposed oil-carrier lecithins. Metal oxides which are paint pigments, such as zinc oxide, have the tendency of forming undesirable granular sedimentation in water-based latex paints. Metal oxides treated by means of this invention with oil-carrier lecithins or with "water-dispersible" lecithin are so modified that they are stable under the same applications for a considerable length of time and continue to be remiscible into smooth uniform coating materials. Metal oxides which are themselves water-insoluble, such as, zinc oxide, synthetic iron oxide, red lead (lead orthoplumbate) and others, after treatment in accordance with this invention without heat application using mechanical treatment with oil-free soybean lecithin or with oil-carrier lecithin, turn at least partially water-soluble; such soluble matter, after boiling the treated metal oxide in water, can be determined as to metal content in the water using atomic absorption analysis of the water.

By means of the mechanical treatment of metal oxides and lecithin mixtures, not only is the metal oxide modified chemically, but the lecithin matter is also modified by the entry of metal oxide materials into the lecithin. Typically, zinc oxide-modified fraction products have been obtained by milling lecithin or oil-free lecithin with zinc oxides of French or American types, independent of the particle size of such pigments. Useful lecithins include plant lecithins, such as, soybean lecithin, safflower lecithin and corn lecithin, and animal lecithins, such as, egg lecithin.

It was established earlier by U.S. Pat. No. 4,126,591 that the addition of oil-carrier lecithin to paints with mixed pigmentation containing pigments having widely different specific gravities allows the restoration of settled-out pigmentation upon shaking or mixing, whereby the entire pigmentation jointly reenters the coating composition, resulting in the initial color shade. Nevertheless, upon the addition of oil-carrier lecithin into the paint such entry did not result in a complete modification of the components—the oil-carrier lecithin still remained as a separate component in the paint. When, therefore, the same composition used in Example 1 of U.S. Pat. No. 4,126,591 was applied to a bare steel panel (such as, Q-Panel R-36) and when such coated panel was used once without lecithin and again with the addition of 3 g of oil-carrier lecithin (ALCO-LEC S) to 50 g of said formulation, exposure tests in a salt-fog chamber for ten days showed that the paint without lecithin remained as a more uniform coating and showed only minor deterioration. But the paint with the added oil-carrier lecithin allowed the salt-fog to enter the coating, in particular, from an inscribed test-cross, to a much greater degree and resulted in extensive deterioration.

However, when the same amount of lecithin, which had first been modified by milling with metal oxides according to this invention, was used in the test paint the coating remained completely intact after ten days of salt-fog exposure. The new complex of this invention had become a uniform component throughout the coating composition.

The new characteristics of the new complex of this invention were established, for instance, in their influence on mineral oils or paraffin-based motor oils in their use as corrosion protective coatings, in particular by exposing so-coated steel panels in an exposure chamber at around 80° to 160° F. with controlled, varying periods of water condensation and cycles of drying (Q-C-T Condensation Tester of the Q-Panel Company). The panels were exposed in an inclined position. Straight oil layers used as corrosion preventives tend to run off gradually under such conditions and the exposed steel begins to corrode within a few days. Also, upon addition of 5 to 10 percent of lecithin to the protective oil, the corrosion protection will decrease after a few days. But the corrosion protective period was extended considerably when using lecithin which was first pretreated with a metal oxide, such as zinc oxide, and ball-milling at room temperature or pretreated by heating with a metal oxide. The maintenance of the protection under humidity and at elevated temperature was further increased by first adding to the lecithin a certain amount of a wax from the group of beeswax or paraffin waxes and subjecting such mixture to milling with zinc oxide, for example. Such modified lecithin matter was then added in an amount of about 5 percent to around 10 percent or more to the rust preventive oil. Full or nearly full protection was obtained for about 40 days under exposure in a condensation chamber at 120° to 160° F. with varying 3-hour cycles between condensation and drying periods.

Such added reaction products between lecithin and zinc oxide were also added to drying type organic coating materials, such as alkyd paints, thereby increasing the resistance of the applied paint or enamel to blistering under salt-fog exposure. The same protective results were obtained using an iron oxide (such as a synthetic iron oxide pigment), a lead oxide (such as red lead pigment) or a tin oxide (such as tin dioxide), as the metal oxide instead of zinc oxide, in combination with lecithin materials.

DETAILED DESCRIPTION OF THIS INVENTION

As used herein, all parts, percentages, ratios and proportions are on a weight basis unless otherwise stated herein or otherwise obvious herefrom to one ordinarily skilled in the art. The following numbered examples set forth the preferred embodiments of this invention:

EXAMPLES 1(a) to 1(c)

The Mechanical Treatment Of Metal Oxide With Lecithin Materials

The mechanical treatment between metal oxides and lecithin materials can be carried out by closely combining the two materials under mechanical pressure, such as, by using a mixing tank with heavy ceramic, flint or metal balls or other forms of mixing units and rotating the mixing container on a ball-mill or by other means for periods of up to one or several hours or longer, whereby no increase in temperature is required. This means that the application of heat energy used in earlier procedures was being replaced by using the mechanical energy to obtain the desired interreaction.

To increase the contact between the lecithin material and the metal oxide, some diluent (such as a volatile solvent) can be added to decrease the viscosity of the lecithin during the milling procedure.

(a) 50 g of red lead pigment (lead orthoplumbate) was mixed with 15 g of toluene until wetted, and 50 g of oil-carrier lecithin was added (ratio: 1 to 1) or 100 g of oil-carrier lecithin was added (ratio: 1 to 2). Both samples were rotated overnight with a milling media in a ball-mill. Other ratios were also used.

(b) 60 g of red lead pigment was intensively mixed with 50 g of oil-carrier lecithin (ratio: 1 to 1), 15 g of mineral spirits was added, and the mixture was rotated with the milling weights or 100 g of oil-carrier lecithin was mixed with the metal oxide and solvent was added afterwards. The samples were rotated overnight with a milling media in a ball-mill. Other ratios were used.

(c) 50 g of red lead was mixed with a solution of 50 g of oil-free alcohol-soluble soybean lecithin fraction in 200 g of solvent. A different ratio between metal oxide and the solution of oil-free alcohol-soluble lecithin fraction can be used in the treatment. The samples were rotated overnight with a milling media in a ball-mill.

Examples of other metal oxides which can be treated by this invention are iron oxide, zinc oxide, lead oxide, tin dioxide, molybdenum trioxide and other metal oxides.

After the treatment and after separation of the modified metal oxides from the surplus of lecithin or lecithin/solvent solution, the modified metal oxide obtained differs in physical and chemical properties from the initial untreated metal oxides. This is shown in the subsequent examples.

EXAMPLE 2

Modified Reflectance Readings Of The Modified Metal Oxide

The red lead pigment mechanically treated in Example 1(a) with oil-carrier lecithin was obtained by diluting the ball-milling product with hexane to promote the sedimentation of the specific heavy pigment. It was then filtered off and separated from the red lead-modified lecithin in the diluent. The pigment was further washed, while still on the filter, with more volatile solvent to remove adherent fluid and was then allowed to dry. It was uniformly dispersed on the bottom of a Pyrex glass beaker and the reflectance of the dispersion was measured for the unmodified metal oxide and the metal oxide modified according to this new procedure through the pigment covered glass surface using a Photovolt Reflection Meter. The difference is expressed by the following values:

TABLE I

| REFLECTANCE MEASUREMENTS USING: | UNTREATED RED LEAD: FILTER: | | | RED LEAD MECHANICALLY TREATED WITH OIL-CARRIER LECITHIN | | |
|---|---|---|---|---|---|---|
| | BLUE | GREEN | AMBER | BLUE | GREEN | AMBER |
| 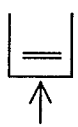 | 3.6 | 35.5 | 53.0 | 3.8 | 33.2 | 49.2 |
| | 3.6 | 37.0 | 54.5 | 3.0 | 32.3 | 51.0 |
| | 3.2 | 39.0 | 54.5 | 3.8 | 33.3 | 49.9 |
| REFLECTANCE READING | 3.47 | 37.17 | 53.83 | 3.52 | 33.37 | 50.0 |

EXAMPLE 3

The Influence Of The Metal Oxide/Lecithin Ratio Upon Reflectance Readings

50 g of red lead pigment was mechanically treated with 50 g of oil-carrier lecithin in the present of 16 g of toluene (Sample A). 50 g of red lead was mechanically treated with twice the amount of oil-carrier lecithin (100 g) in the presence of 15 g of toluene (Sample B). Both modified pigments were recovered as described in Example 1 and were used to prepare corresponding paint compositions using:

30 g of mechanically-lecithin-treated red lead (SAMPLE A or SAMPLE B), 36 g of titanium dioxide, rutile, 35 g of long oil soybean alkyd resin (Aroplaz 1266 M 70), and 10 g of toluene.

After the ball-milling, the test paints were stored in closed containers for about one week. The red lead pigment of high specific gravity in the paint of Sample A settled to the bottom more than in Sample B (where the pigment had been treated with the greater amount of lecithin). Besides, in the paint of Sample A the upper part of the stored paint became lighter in color than did the paint in the lower part, which contained the larger amount of settling modified red lead. In the paint of Sample B the whole paint retained its color during the storage. Nevertheless, due to the introduced lecithin matter in both modified red lead pigments, it was possible to restore the color by simply shaking the paint jar manually without requiring an addition of separate lecithin to the paints. This was established by applying both paints (with Sample A and with Sample B) after the shaking to surfaces and allowing them to dry. Afterwards their color was compared using a Photovolt Reflection Meter, Model 670, with three filters, as shown below:

TABLE II

REFLECTANCE READINGS OF THE APPLIED COATINGS USING THE RED LEAD MODIFICATIONS A AND B

| | PAINT USING RED LEAD MODIFICATION A | | | PAINT USING RED LEAD MODIFICATION B | | |
|---|---|---|---|---|---|---|
| FILTER: | BLUE | GREEN | AMBER | BLUE | GREEN | AMBER |
| | 39.5 | 69.0 | 83.5 | 38.4 | 68.9 | 83.4 |
| | 41.0 | 69.5 | 83.0 | 39.4 | 69.3 | 82.7 |
| | 40.5 | 69.0 | 81.7 | 39.0 | 68.5 | 83.2 |

The remixed paints had, therefore, closely the same order of reflectance despite the fact that before remixing the metal oxide, treated with the lecithin in the ratio of one part of metal oxide to two parts of lecithin, more effectively maintained its stability upon suspension.

EXAMPLE 4

Determination Of The Lighter Colored Reaction Product And Oil-Carrier Lecithin Under The New Treatment

When an oil-carrier lecithin was mixed with acetone, an acetone-soluble-oil carrier fraction went into solution. But the straight lecithin fraction was acetone insoluble and was precipitated (that is why granular pure soybean lecithin can be produced thusly from oil-carrier crude lecithin). The appearance of the precipitated lecithin fraction obtained from crude oil-carrier lecithin (such as the commercial ALCOLEC S) and of such precipitations, after such lecithin material has been heated with metal oxides, such as red lead, according to U.S. Pat. No. 4,305,853, can be compared with the appearance after the same lecithin with red lead has been mechanically treated according to the new invention. The precipitates were separated and placed on glasssplates. Their reflectance values, using a Photovolt Reflection Meter, were compared as follows:

TABLE III

| | | PRECIPITATES FROM | |
|---|---|---|---|
| FILTER USED | CRUDE ALCOLEC S | AFTER HEATING WITH RED LEAD ACCORDING TO U.S. Pat. No. 4,305,853 | AFTER MECHANICAL TREATMENT WITH RED LEAD ACCORDING TO THE NEW INVENTION |
| BLUE | 61.0 | 5.0 | 81.0 |
| | 64.5 | 6.0 | 84.0 |
| | 55.0 | 5.0 | 84.0 |
| GREEN | 80.0 | 6.0 | 35.6 |
| | 71.0 | 5.8 | 34.0 |
| | 78.0 | 6.0 | 38.5 |
| AMBER | 41.0 | 7.0 | 56.0 |
| | 40.0 | 7.4 | 65.0 |

TABLE III-continued

| FILTER USED | CRUDE ALCOLEC S | PRECIPITATES FROM AFTER HEATING WITH RED LEAD ACCORDING TO U.S. Pat. No. 4,305,853 | AFTER MECHANICAL TREATMENT WITH RED LEAD ACCORDING TO THE NEW INVENTION |
|---|---|---|---|
| | 41.0 | 7.2 | 51.0 |

EXAMPLE 5

Determining The Effect Of The New Mechanical Treatment In The Ultraviolet Spectrum To establish the different effects of the earlier heat treatment and the new mechanical treatment between the same oil-carrier lecithin and the same metal oxide (red lead), corresponding hexane solutions of the untreated oil-carrier lecithin (ALCOLEC S), of oil-carrier lecithin which has been treated using the heat process of U.S. Pat. No. 4,305,853 and of oil-carrier lecithin treated using the new mechanical process of this invention were subjected to studies of the percent transmission in the ultraviolet range using a Beckman DB Spectrophotometer. From the transmission readings, the absorbances were calculated using the equation:
ABSORBANCE (A) equals 2 minus the logarithm of $10^{-9}$ of the percent transmission.
The results were:

TABLE IV

Transmission And Absorbance Values In The Ultraviolet Range

| Wavelength (millimicrons) | ALCOLEC S | | ALCOLEC S Mechanically Treated With Red Lead | | ALCOLEC S Heat-treated With Red Lead | |
|---|---|---|---|---|---|---|
| | % Transmission | Absorbance | % Transmission | Absorbance | % Transmission | Absorbance |
| 200 | 45 | 0.35 | 31 | 0.51 | 15.3 | 0.81 |
| 220 | 5.5 | 1.26 | 1.3 | 1.89 | 1 | 2 |
| 240 | 16 | 0.80 | 3.1 | 1.51 | 0 | 2 |
| 260 | 41 | 0.39 | 20.6 | 0.69 | 0 | 2 |
| 280 | 41 | 0.39 | 21.5 | 0.67 | 5 | 1.30 |
| 300 | 50 | 0.30 | 33.3 | 0.48 | 16.8 | 0.77 |
| 320 | 64 | 0.19 | 49.3 | 0.31 | 22.8 | 0.64 |
| 324 | 71 | 0.15 | 56 | 0.25 | 28.3 | 0.55 |

These data again identified the difference between the interreactions occurring from the new mechanical treatment versus those occurring from earlier heat treatment of U.S. Pat. No. 4,305,853.

That different metal oxides result with the same oil-carrier lecithin in different transmission readings is shown by comparing lecithin which has been mechanically treated with red lead (lead orthoplumbate) and the same type of lecithin which has been mechanically treated with zinc oxide.

TABLE V

Transmission And Absorbance Values In The Ultraviolet Range

| Wavelength (Millimicrons) | ALCOLEC Mechanically Treated With Red Lead | | ALCOLEC S Mechanically Treated With Zinc Oxide | |
|---|---|---|---|---|
| | % Transmission | Absorbance | % Transmission | Absorbance |
| 200 | 31 | 0.51 | 43.5 | 0.36 |
| 220 | 1.3 | 1.89 | 3.7 | 1.43 |
| 240 | 3.1 | 1.51 | 10 | 1 |
| 260 | 20.6 | 0.69 | 21 | 0.68 |
| 280 | 21.6 | 0.67 | 38.8 | 0.41 |
| 300 | 33.3 | 0.48 | .55.2 | 0.26 |
| 320 | 49.3 | 0.31 | 68 | 0.17 |
| 340 | 56 | 0.25 | 76 | 0.12 |

The same test method is applicable to oil-free lecithins, such as, the oil-free alcohol-soluble fraction of soybean lecithin (ALCOLEC 642-AO), and to oil-free lecithin powder (ALCOLEC F-100) (in 1:2 solution in hexane) after ball-milling with red lead. Readings of the hexane solution in the ultraviolet range are:

TABLE VI

The Oil-Free Alcohol-Soluble Fraction Of Soybean Lecithin With Red Lead:

| Wavelength (Millimicrons) | Oil-Free Alcohol-Soluble ALCOLEC 642-A | | ALCOLEC 642-A Mechanically Treated With Red Lead (Ratio: 1 red lead to 1 lecithin) | |
|---|---|---|---|---|
| | % Transmission | Absorbance | % Transmission | Absorbance |
| 200 | 41.2 | 0.38 | 31 | 0.51 |
| 220 | 7 | 1.1 | 4.1 | 1.39 |
| 240 | 7 | 1.1 | 5.5 | 1.26 |
| 260 | 35 | 0.45 | 24 | 0.62 |
| 280 | 32 | 0.49 | 19.6 | 0.71 |
| 300 | 45 | 0.35 | 28.6 | 0.54 |
| 320 | 65.5 | 0.18 | 48.3 | 0.32 |
| 340 | 71.3 | 0.15 | 53.4 | 0.27 |

TABLE VII

The Oil-Free Lecithin Powder With Red Lead:

| Wavelength (Millimicrons) | ALCOLEC F-100 Oil-Free Lecithin Powder | | ALCOLEC F-100 Mechanically Treated With Red Lead (Ratio: 1 red lead to 1 Lecithin) | |
|---|---|---|---|---|
| | % Transmission | Absorbance | % Transmission | Absorbance |
| 200 | 52.6 | 0.28 | 42.5 | 0.37 |
| 220 | 5.5 | 1.26 | 2.2 | 1.66 |
| 240 | 23.2 | 0.63 | 10.7 | 0.97 |
| 260 | 47.3 | 0.32 | 34.3 | 0.46 |
| 280 | 47.2 | 0.32 | 34.7 | 0.46 |
| 300 | 56.3 | 0.25 | 44.0 | 0.36 |
| 320 | 75.3 | 0.12 | 64.3 | 0.19 |
| 340 | 84.3 | 0.07 | 74.7 | 0.13 |

EXAMPLES 6(a) to 6(e)

Establishing The Modification Of The Metal Oxides With Lecithin By Electrodeposition If a metal oxide or metal salt can be dissolved in water, such solution will be slightly acidified. When two electrodes are immersed in the solution, an electric current will then direct the metal ions to the cathode and will deposit them thereto. This can be carried out with an Eberbach Electro-Analyzer or other electrodeposition tester. The amount of the resulting metal deposit can be determined as the change in weight of the electrode.

But it has been established by Dr. Max Kronstein some time ago that metal oxides which have been complexed in any available manner with an organic grouping, such as low polymeric groupings, when mixed or boiled in water, will afterwards give up complexed groupings into the water, even though some of the metal groupings might still be present in non-complexed form. In such cases the electric current will carry the complexed metal groupings not to the cathode, but to the anode, and they will be deposited there. (Besides, the not yet complexed metal matter still might go to the cathode.) Therefore, the weight addition of both together will then represent 100 percent of the total deposit, and the deposited amounts on each of the electrodes represents the parts of this total. The ratio between them expresses the degree of complexing which has taken place between the metal oxide and the organic matter.

It has been established that lecithins form with metal oxides such complexes which migrate in water dispersion to the anode. And, the non-complexed metal matter migrates to the cathode. This also makes it possible to demonstrate that this invention in the modification of metal oxides with oil-carrier or the oil-free lecithins at least partially represents such complex formation. The following experimental data documents this fact:

(a) 25 g of red lead and 25 g of oil-free alcohol-soluble lecithin fraction (ALCOLEC 642 A) were ball-milled and afterwards heated together to 130° C. for 30 minutes. 10.6 g of the thus-obtained, separated, modified metal oxide was then boiled in 500 cc of distilled water and subjected, after filtering and the slight addition of acid, to an electric current:
92.2 percent of the total deposit was recovered at the anode, and
7.8 percent at the cathode.

(b) 25 g of red lead and 25 g of granular lecithin ALCOLEC F 100) in the presence of some diluent, such as 100 g of hexane, were ball-milled without any subsequent application of heat. The solid reaction product was recovered and 5 g of it was boiled in 450 cc of distilled water for 30 minutes. After filtration, an electric current of 3 volts (1 ampere) carried in the water solution (pH 3):
75 percent of the total deposit to the anode, and
25 percent to the cathode.

(c) 30 g of zinc oxide was ball-milled with 100 g of oil-carrier lecithin (ALCOLEC S). Twenty grams (20 g) of the recovered solid product was boiled in 200 cc of water, and the subsequent electrodeposition test carried:
85.54 percent of the total deposit to the anode, and
14.46 percent to the cathode.

(d) 130 g of synthetic iron oxide (MAPICO RED 347) was ball-milled with 50 g of granular oil-free lecithin and 100 g of hexane. The modified solids were recovered and 25 g of them was boiled in 200 g of water and diluted 1:1. Subsequently the electrodeposition test was applied to the slightly acidified solution, using 8 volts of current (1.5 amperes). The current carried:
61.76 percent of the total deposit to the anode, and
39.24 percent to the cathode.

(e) In a corresponding test, 130 g of synthetic iron oxide was ball-milled with 50 g of oil-carrier lecithin (ALCOLEC S) and 25 g of hexane. The modified solids were recovered and 25 g of them was boiled in 200 g of water. The electrodeposition test was applied again:
60.9 percent of the total deposit went to the anode, and
39.1 percent to the cathode.

In all of these cases, using different metal oxides and difference forms of lecithin, the modified metal oxide/lecithin products demonstrated the actual chemical modifications under these deposition conditions. A water solution in which not-lecithin-treated metal oxide had been boiled, showed no deposit at the anode under the test conditions.

EXAMPLES 7(a) and 7(b)

Identifying The Metal Oxide/Lecithin Reaction Product In The Residual Lecithin Fraction According to the procedure of Example 6, synthetic iron oxide was ball-milled with oil-carrier lecithin and with oil-free lecithin—in both cases the modified iron oxide solids was recovered and separated from the iron oxide treated lecithin. Such lecithin fraction also was established to now contain iron oxide modifications as a component:

(a) This was established by heating 2 g of the iron oxide treated oil-free lecithin in 20 g water and heating 2 g of the iron oxide treated oil-carrier lecithin in 20 g of water. Afterwards, the only form in which iron matter could have entered into the distilled water was from the reaction product. An electrodeposition test at 8 volts current (1.5 amperes) delivered at the electrode(s) as follows:

TABLE VIII

| | MODIFICATIONS WITH IRON OXIDE | |
|---|---|---|
| | Water Solution Of Modified Granular Lecithin | Water Solution Of The Modified Oil-Carrier Lecithin |
| Deposited At Cathode: | 0.0368 g (38.1%) | 0.0081 g (39.1%) |
| Deposited At Anode: | 0.0598 g (61.9%) | 0.0126 g (60.9%) |
| Total Deposits: | 0.0966 g | 0.0207 g |

(b) Comparing these totals, it was evident that the straight lecithin had produced a higher degree of reacted matter than did the oil-carrier lecithin. Corresponding tests of the same manner but using 2 g each of granular lecithin which had been earlier ball-milled with red lead or 2 g of oil-carrier lecithin which had earlier been earlier ball-milled with red lead and heating 2 g of each with 20 g of water, produced the following electrodeposits:

TABLE IX

| | MODIFICATIONS WITH RED LEAD | |
|---|---|---|
| | Water Solution With Modified Granular Lecithin | Water Solution Of The Modified Oil-Carrier Lecithin |
| Deposited At Cathode: | 0.1043 g (46.29%) | 0.0089 g (6.99%) |
| Deposited At Anode: | 0.1214 g (53.79%) | 0.1372 g (93.91%) |
| Total Deposits: | 0.2257 g | 0.1461 g |

The higher total deposits demonstrated that the red lead was here more reactive in the ball-milling with the lecithins than was the synthetic iron oxide, even though both were produced by the same general reaction.

EXAMPLES 8(a) to 8(d)

Identifying The Modification In the Higher Water-Solubility Using Atomic Absorption Analysis It was established that the mechanical treatment of metal oxides with lecithin materials (containing oil-carrier lecithin or oil-free) modified such metal oxides by increasing their water-solubility. This was done by boiling untreated metal oxides and boiling such lecithin-treated metal oxides in water and then testing for the presence of the metal derived from such metal oxide by subjecting the water solutions to atomic absorption analysis. This meant that, under the provided instrument conditions, the water solutions were guided into a flame, and the presence and the amount of the metal tested according to the discoloration of the flame (using a special cathode tube and after calibration of the absorption reading in the instrument). The amount of metal in the solution can be determined. Such a calibration curve was obtained using standard solutions containing known amounts of the test metal and determining, for each such known concentration, the absorption reading in the flame. As an example, the following data is given:

TABLE X

| Standard Reading | Absorption |
| --- | --- |
| 20.0 ppm Pb | 19.3 |
| 15.0 ppm Pb | 14.4 |
| 10.0 ppm Pb | 9.9 |
| 5.0 ppm Pb | 5.0 |
| 0.0 ppm Pb | 0.0 |

Using such calibration from the absorbance reading of the test flame, the metal content can be obtained in parts-per-million (ppm). So the following determinations were made:

(a) When 20 g of plain red lead was ball-milled in 200 cc of water, the instrument found no absorbance in the lead determination, that is, no presence of lead in the water. But when 100 g of red lead was first ball-milled with 50 g of oil-carrier lecithin (ALCOLEC S) and then 20 g of the modified product was boiled in 190 g of water, the test showed the presence of 57 ppm of Pb or 57 mg of lead per liter of solution or 10.8 mg of lead in the 190 cc of the solution which was used here.

(b) When 100 g of red lead was ball-milled with 50 g of oil-free lecithin (ALCOLEC F 100) and 20 g of that product was boiled in 195 g of water, the instrument found 78 ppm or 78 mg of lead per liter of solution. That was 15.3 mg of lead in the 195 g of solution used here. For comparison, the method was applied also to a red lead heat-treated with the oil-carrier fraction of crude soybean lecithin (the acetone-soluble lecithin fraction, or "red oil"), specifically heating 30 g of red lead with 100 g of "red oil" to 170° C. When this recovered material was boiled in water, the instrument found 90 ppm of lead in the water.

(c) In the same way: when 20 g of synthetic iron oxide was boiled in 200 g of distilled water, the instrument found no iron. But when first 100 g of iron oxide was ball-milled with 50 g of oil-carrier lecithin and the isolated product was used, boiling 20 g of such modified iron oxide in 200 cc of water, the instrument found 19.0 ppm of iron or 19 mg of iron per liter of solution or 3.8 mg on iron in the 200 cc of solution used here. These facts established again that, when mechanically treated in the presence of lecithin materials (oil-carrier lecithin and oil-free lecithin), the metal oxides were chemically modified without requiring the application of heat. In this case, the water-solubility was increased.

(d) In another example, two samples of zinc oxide (American Type AZO 55) was mechanically treated with oil-carrier lecithin and with oil-free lecithin (ALCOLEC F 100), respectively, using different ratios between the metal oxide and lecithin. Afterwards, different degrees of water solubility were established according to the ratio between the metal oxide and the form of lecithin used.

EXAMPLE 9

The Influence Of A Prior Modification Of The Lecithin Material Before Reaction With A Metal Oxide The reactive character of the lecithin material can be modified for instance by a partial hydroxylation and the so-modified lecithin material can be used in mechanically treating metal oxides without the application of heat, whereby a lecithin product is obtained of increased water solubility. Thereafter, such reaction product can be used in water-dispersed pigmented coating materials, such as latex paints, in order to obtain even after a storage period a readily redispersed pigmentation in such paint material. 100 g of partially hydroxylated lecithin (ALCOLEC 621), 30 g of zinc oxide (AZO 55) and 10 g of hexane were ball-milled overnight. Thereafter, the hexane was allowed to evaporate. In spite of its viscous condition, the product was suitable for use in preparing a water-based latex paint, based on 80 parts of polyvinyl acetate latex (POLYCO 117-SS-55 percent solids, Borden) and 20 parts of water-dispersible alkyd resin (AROLON 585-43 percent solids, Spencer Kellogg/TEXTRON) with 80 parts of titanium dioxide, rutile, and 1 part of carbon black, using 20 to 25 parts of water as diluent and adding 1 part of antifoaming agent (Nopco NXZ, Diamond Shamrock). 1 to 4 parts of the metal oxide-modified hydroxylated lecithin were used. (When a very much larger amount (8 parts) was used, the surplus remained at least partially undispersed.) The water-based paint was applied to primer-coated steel panels and gave a strong and adherent coating. By this or other suitable pre-modification of the lecithin material, the new process of reacting the lecithin material with metal oxide without the application of elevated temperature can be applied to water-based paint systems.

EXAMPLE 10

Influence Of The Zinc Oxide/Lecithin Ratio On The Resulting Water-Solubility (Expressed In The Resultant Zinc Content In A Water Solution) Atomic Absorption Analysis After zinc oxide and lecithin was ball-milled overnight, 20 g of the recovered modified zinc oxide was boiled in 150 g of water for 20 minutes. The solution was filtered and further diluted 1:4 with distilled water. This water was analyzed by atomic absorption analysis for its content of zinc, and the following data was obtained:

TABLE XI

| ZnO Ratio Used In Ball-Milling Mixture | Lecithin | | Zinc Content In Prepared Solution | |
|---|---|---|---|---|
| Zinc Oxide (Not pre-treated) (grams) | Oil-Carrier Type (grams) | Oil-Free (grams) | Absorbance Reading | ppm Zinc |
| For Comparison: | | | | |
| 100 g | — | — | 3 | 2.0 |
| Tests: | | | | |
| 100 | 15 | — | 12 | 7.5 |
| 100 | — | 15 | 29 | 18.0 |
| 100 | 50 | — | 40 | 26.0 |
| 100 | — | 50 | 91 | 100.0 |

The data established that the degree of modification of the metal oxide (zinc oxide) increased with the lecithin ratio and that the straight lecithin was even more reactive than the crude oil-carrier lecithin in these mechanical treatments. This water-solution of the lecithin modified-zinc oxide represented a complexed-zinc-carrying water.

EXAMPLE 11

Using Lecithin-Modified Metal Oxide Pigments In Corrosion Protecting Paints

The different form of entry of unmodified lecithin and of the modification product between lecithin and a metal oxide according to this invention was evident from the following procedure: As the initial paint composition, the following formulation was used:
200 g of red lead pigment
240 g of titanium dioxide, rutile
220 g of soybeanoil-modified alkyd resin (AROPLAZ 1255 M 70)
60 g of diluent (toluene).

When the composition was applied to an unprimed steel panel (Q-Panel R-36) and was exposed in a salt-fog chamber for ten days, having an inscribed "test cross", it showed only limited salt-fog effects, except for one failure at the upper edge of the coating, where the paint film was somewhat thinner due to some flow-off during the drying of the panel in vertical position, and except for a few small rust spots.

But, when in order to increase the suspension of the specific heavy pigment, 3 g of oil-carrier lecithin (ALCOLEC S) and 7 g of diluent (toluene) were added to 50 g of the test paint-ball-milling mixture and the resultant coating material was applied to an unprimed steel panel, exposure in the salt-fog chamber of ten days resulted in a considerable loosening of the coating around the inscribed test cross. There the salt-fog was able to much more extensively penetrate into this no-longer-uniformly-dried coating film.

On the other hand, when the oil-carrier lecithin was first modified according to this invention, using the lecithin after ball-milling 100 g of oil-carrier lecithin (ALCOLEC S) with 30 g of zinc oxide and using this ball-milling product, adding again to 50 g of the test paint ball-milling mixture such zinc oxide-modified lecithin instead of the untreated lecithin a considerable increase in the salt-fog resistance was obtained. When 1.8 g of zinc oxide-lecithin modification was used with 8.2 g of diluent (toluene), and this was added to the paint formulation, this paint was applied to an unprimed steel panel. A ten-day exposure in the salt-fog chamber produced only one small failure spot at the upper part of the coating where the coating thickness was thinner.

When the same amount of the zinc oxide-modified lecithin was used as had been used of the unmodified oil-carrier lecithin, that is, 3 g to 50 g of paste, the salt-fog produced no failure at all after ten days of exposure.

The reverse sides of all four test panels, which had been less exposed to the salt-fog and its condensations and which had no inscribed test cross, remained undamaged. The results confirmed that the new metal oxide-modified lecithin of the ball-milling procedure had become a stable component in the test paints.

EXAMPLE 12

The same test paints as used in Example 11 were applied to bare aluminum panels, using the paint: (a) with unmodified oil-carrier lecithin; (b) with a small amount of the new modification with metal oxide (zinc oxide); and (c) using the same amount of the modified product as was used in test paint (a) when unmodified lecithin was used.

These coated aluminum panels were exposed in a humidity-condensation tester (the Q-C-T Condensation Tester of the Q-Panel Company) at a temperature of 40° C., using a changing cycle of three hours of condensation and three hours of drying over a period of eleven days. After this time, a plastic tape was pressed solidly against the test-cross area of each panel. When this tape then was quickly lifted off, the paint having the unmodified lecithin was pulled loose from the bare panel. None of the paints with the new modified product showed any damage due to the tape-lifting. The paints adhered well to the aluminum.

EXAMPLE 13

The Effect Of Lecithin-Pretreated Metal Oxide Pigments On Water-Based Antifouling Paints Max Kronstein in "Controlled Release of Polymeric Organometal Toxicants", I & EC Product Research & Development, Vol. 20, No. 5, (1981), established that underwater-exposed antifouling paints were effective in preventing fouling growth by their progressive release of reaction products between the vehicle of the coating matter and the metal oxide pigments whereby with the progressive release the added toxicant in the paint becomes a part of the release. Therefore, the released complex matter produced the desired protection against fouling.

It was established by this invention that the lecithin treatment of the metal oxide pigment considerably influenced the initial rate of the complex release as well as the rate of the subsequent further insolubilization of the released matter. The released matter was sedimented to the immersed steel-surface and the wall of the immersion tank. Therefore, the content of the metal component of the used organometal toxicant also expressed the rate of the complex-release from the antifouling paint.

In this Example a triphenyl lead acetate toxicant was used in a metal oxide-latex paint and was applied to steel panels (R-36 Q-Panels), with the coating being applied to both sides (total area of 36 sq. in.). The panels were immersed each in 600 cc of distilled water.

The water-based test paints were prepared using as vehicle a combination of 3 parts of polyvinyl acetate latex (POLYCO 117-SS) (with 55 percent solids) and one part of water-dispersed alkyd resin (AROLON 585) (with 43 percent solids) under addition of a small amount of an antifoaming agent. As the pigment, zinc oxide (AZO 55) was used as one and manganese dioxide was used as the other—each being used once in its original form, and the other time after lecithin pretreatment.

After water immersion and progressive complex-release, the resultant amount of lead in the immersion water was analyzed, such as, had been released in the complex originating from the toxicant component. The analysis was made using atomic absorption spectroscopy. The results showed that the lecithin-pretreated pigmentation caused an increased rate of complex-release, but resulted in subsequent insolubilization of the reaction complex with its lead component, whereby the residual lead content again decreased.

TABLE XII

Atomic Absorption Test Results*

| With Zinc Oxide Pigment | | | | With Manganese Dioxide Pigment | | | |
| --- | --- | --- | --- | --- | --- | --- | --- |
| Untreated | | Lecithin Pretreated | | Untreated | | Lecithin Pretreated | |
| Days Of Immersion | ppm Pb | Days Of Immersion | ppm Pb | Days Of Immersion | ppm Pb | Days Of Immersion | ppm Pb |
| 75 | 0 | 11 | 2.8 | 10 | 2.0 | 11 | 4.5 |
| 124 | 1.4 | 28 | 6.75 | 21 | 3.0 | 25 | 5.0 |
| 174 | 1.8 | 60 | 1.0 | 56 | 4.0 | 31 | 6.0 |
| 219 | 0.8 | 78 | 0.5 | 76 | 1.5 | 46 | 4.0 |
| 226 | 0 | 116 | 0 | 81 | 0 | 66 | 2.3 |
| | | | | | | 336 | 0 |

*These releases took place without interfering with the integrity of the applied coating.

EXAMPLE 14

Preparing A Metal Oxide-Lecithin Additive For Use In Coating Compounds To Increase Their Corrosion Resistance A compound, for use as an additive to increase the corrosion resistance in drying type coatings (such as paints) as well as for non-drying-type corrosion inhibiting oil (mineral oil or paraffin) type protective applications, was prepared using either plant-lecithin (soybean lecithin, safflower lecithin, or corn lecithin, or others), or animal lecithin (egg lecithin or others). 100 g of lecithin was milled with about 30 g of zinc oxide or 25 g of a lead oxide such as lead orthoplumbate (red lead) or 35 g of tin dioxide (stannic) or other metal oxides, eventually under the addition of some volatile diluent. (Such diluent varied between 20 g and 40 g or more of solvent according to the fluid or solid state of the lecithin, which was being used—in these tests, hexane was used.)

After the milling the resultant product contained the reaction product between the metal oxide and lecithin as well as an eventual surplus of metal oxide. It was used either unfiltered or the ball-milling product was filtered, eventually after addition of additional volatile diluent. The unreacted surplus of metal oxide was separated from the diluted reaction compound. This compound was used as corrosion-prevention additive in the form of such filtered solution, or the volatile solvent was removed and the reaction compound was used for itself as such additive.

The viscosity of this reaction product was further increased by mixing the lecithin (for instance, 100 g of oil-carrier lecithin) with some wax material, such as, an animal wax (such as, 50 g of ground beeswax) or paraffin wax, and heating the mixture until the components were well mixed. Then the metal oxide (in these tests, 30 g of zinc oxide) was added. Eventually a suitable diluent was added (such as, 30 g of hexane) and the mixture was milled.

The milling product was diluted with an additional volatile solvent to facilitate the filtration. After removal of such solvent, the filtrate represented a yellowish compound which was more viscous than the metal oxide/lecithin product itself. This form was also used as a very successful additive to non-drying type rust preventive oil coatings in order to delay or prevent their flowing off under exposure at elevated temperatures.

EXAMPLE 15

Application Of Metal Oxide/Lecithin Ball-Milling Products As Additive To Drying-Type Coatings A high gloss alkyd enamel paint (consisting of about 30 parts of pigment, such as 92 percent of titanium dioxide and 8 percent of zinc oxide, and about 70 parts of vehicle, containing about 94 percent of oil-modified alkyd resin solids) was modified by adding to 100 parts of enamel paint, about 5 parts of soybean lecithin/zinc oxide ball-milling-complex, diluted with some volatile solvent, in order to facilitate a readily-made combination. The modified enamel paint was applied to steel panels over a primer coating (such as, Specification MIL-P-15328B). The panels were marked with an inscribed test-cross and were exposed in the salt-fog test chamber. After an exposure of one month these panels were in good condition and, even in the test-cross area, showed less corrosion effect and fewer blisters than the enamel without such modification.

EXAMPLE 16

Application To Rust-Protective Non-Drying Oils

As rust-preventive non-drying oil, such as, are used to protect in particular bare steel or polished steel units during storage or transportation and which form coatings capable of being removed before applying the permanent coatings, this Example uses either lubricating oil type materials of the SAE Grade 10 or a detergent type motor oil, such as, those according to U. S. Specification MIL-L 46152 and MIL-L-31 041, or other grades. When such or similar non-drying mineral or paraffin oils were applied to steel or other metals, which were capable of corroding, and when such coated panels were exposed in a humid atmosphere, such as, a Condensation Tester of the Q-Panel Company, at a temperature of 120° to 160° F. using for instance a three-hour cycle between the condensation of moisture and of drying periods and exposing the panels there in an upright or inclined position, the oil films tended to gradually flow off. The exposed panels then soon corroded. But when 5 to 10 percent of the reaction products according to Example 14 or more (preferred: about 7 percent) were added to the protective oil, the coating remained much more stable and their corrosion protective effects were more stably maintained. The unfiltered ball-milling compounds were even more effective than the filtrate when added to the oil because the residual suspension of zinc oxide matter increased the corrosion resistance of the prepared protective oil.

EXAMPLES 17(a) to 17(e)

Examples For Such Exposure Applications

Comparative exposure tests were made in the humidity-condensation tester (as used in the preceding example) over periods of 40 to 50 days. Test panels 3 inches by 6 inches in size of automotive steel (R-36 Q-Panels), which had been coated with the unmodified protective oils, already showed runoff of the oils after a few days and then progressingly developed increased corrosion areas.

(a) When lecithin was used as an additive to non-drying oils without pretreatment with metal oxides, it did not prevent the runoff of the oil under the exposure conditions. An addition of crude soybean lecithin (with oil-carrier), when added at an amount of 5 percent, to a lubricating oil of classification SAE 10 did not prevent the whole surface of the exposed steel panels from showing uniform corrosion after a 24 day exposure. With the 10 percent addition, only some edge areas showed corrosion. Paraffin type motor oil, when used as a protective application, did not prevent corrosion of the steel panels after 24 days of exposure even with 5 percent or with 10 percent addition of unmodified lecithin.

(b) An addition of 5 percent or 10 percent of the same lecithin, after it had been milled with zinc oxide, to SAE 10 lubricating oil prevented any corrosion of the steel surface after 25 days of exposure under the same conditions. And the same result was found when corn lecithin instead of soybean lecithin was milled with zinc oxide and the milled product was used as the additive.

(c) Corresponding results were obtained using the same lecithin which was milled with tin dioxide (stannic) or with red lead according to Example 13. When the milled products were used as 7 percent additives to SAE 10 lubricating oil and applied to steel surfaces, exposure at 50° C. for 19 days showed no corrosion areas.

(d) an addition of a combination of 2 parts of oil-carrier lecithin and 1 part of beeswax, after having been milled with zinc oxide, prevented any corrosion areas from being formed in coatings containing paraffin-type motor oil or SAE 10 lubricating oil under these test conditions.

(e) Even though an addition of 4 percent of paraffin wax to a lubricating oil might increase its viscosity, it did not prevent extensive corrosion of the steel panels under the same exposure conditions. When a mixture of 1 part of paraffin wax and 2 parts of oil-carrier lecithin were ball-milled with zinc oxide and such a mixture was added in an amount of 10 percent or more to SAE 10 lubricating oil, no corrosion took place after 25 days of exposure.

EXAMPLE 18

Extending The Rust Preventive Effects To Lecithin Products With (Synthetic) Iron Oxide The effects shown in the preceding Examples were not limited to such metal oxides which are generally known as being reactive pigments, such as, lead oxide, zinc oxide and others. Even iron oxides were found to form complexes with lecithin and were effective as additives to rust preventive oils.

In Example 8(c) it was shown that in ball-milling synthetic iron oxide with oil-carrier lecithin and boiling the reaction product in water, the subsequent atomic absorption test detected 19.0 ppm of iron in the water (even though straight iron oxide was so water-insoluble that no iron entered the water). Therefore, it was established that iron oxide also formed a complex with lecithin upon ball-milling.

This complex was used as follows: 100 g of oil-carrier lecithin (ALCOLEC S) was ball-milled with 30 g of iron oxide (MAPICO RED 347) using 5 small balls (½ inch porcelain balls) having a total weight of 18 g as the load. The paste was milled overnight. Then SAE 10 lubricating oil was used with an addition of 5 percent of this paste or with 10 percent of this paste, and automotive steel panels were so-coated and exposed in a condensation tester. First, a temperature of 40° C. was used for 7 days with the same three-hour cycles. The sample having 5 percent additive showed one slight corrosion spot at the left upper edge. The sample with 10 percent additive was free of corrosion. During the next 13 days the temperature was increased, reaching during the last 4 days as much as 80° C. Afterwards the appearance of the panels showed no further change. In a further extended exposure at 50° C. the exposed surfaces showed no further change after 40 days of exposure.

EXAMPLE 19

The Particle Size Of The Metal Oxide In Its Reaction With Lecithin Materials

The zinc oxide pigment used in the preceding examples was a regular zinc oxide pigment (such as AZO 55) having a particle diameter of 0.27 microns and a surface area of 4 sq.m/gram. To establish whether or not the particle size of the metal oxide in these complex formations had a considerable influence in the reaction with the lecithins and the application of the reaction products, another zinc oxide was used (AZO 77S) which had a particle size (0.13 micron diameter) one-half of the former and a surface area of 8 sq.m/grams. After ball-milling with the lecithin, 7 percent of this milling product was added to SAE 10 lubricating oil. Even though the very fine dispersion of such a small particle size pigment might decrease the uniform covering of a coated surface film, the product was applied to a steel panel and exposed successfully for 19 days at 50° C. in a humidity condensation tester.

The above descriptive examples concerning the preparation, application and effectiveness of mechanical interreaction products between lecithin materials and metal oxides illustrate and detail the best mode of this invention.

We claim:

1. Process for the production of a paint containing a chemically-modified lecithin material, which is a reaction product between lecithin and metal oxide comprising mechanically treating lecithin material with metal oxide without any application of heat, thereby producing lecithin-treated metal oxide and metal oxide-treated lecithin, separating the lecithin-treated metal oxide and the metal oxide-treated lecithin, drying the lecithin-treated metal oxide, dispersing the lecithin-treated metal oxide by pressure or milling into a powder form, and using said powder as a pigment in the formulation of a solvent-based or water-based paint, such mechanically-with-lecithin-pretreated pigment being used either as the only pigment or together with another pigment, untreated or lecithin-pretreated, whereby such resultant paint has different properties than a paint of the same formulation but having the same pigment or pigments without any prior lecithin pretreatment.

2. Process as claimed in claim 1 wherein the mechanical treatment comprises ball-milling the oxide with the lecithin materials or their solutions using ceramic, or stone or metal balls or weights in order to produce the mechanical impact for modifying the components.

3. Process as claimed in claim 1 wherein the mechanical treatment comprising using a form of mechanical impact.

4. Process as claimed in claim 1 wherein the mechanical treatment is followed by dispersion of the reaction product in a volatile diluent, and the separation step is achieved by sedimentation or filtration of the lecithin-modified metal oxide from the fluid filtrate representing the residual lecithin-containing suspension.

5. Process as claimed in claim 4 wherein the extent of the obtained modification of the lecithin component in the filtrate is established by comparing the transmission readings of the obtained spectroscopic measurements in the ultraviolet region for the initially used lecithin and for the fluid fraction of the obtained lecithin-metal oxide reaction product.

6. Process as claimed in claim 1 wherein the metal oxide is zinc oxide, a tin oxide, a molybdenum oxide or a heavy metal oxide.

7. Process as claimed in claim 1 wherein using a metal oxide which is nearly or fully insoluble in water, a modified form of lecithin material which is at least to an extended degree water-soluble, is produced by mechanical treatment thereof, and thereafter the amount of dissolved metal matter in the solution is determined by applying a suitable test method which identifies the amount of metal which has entered the water solution from the contact of or from heating the lecithin-modified metal oxide with water.

8. Process as claimed in claim 7 wherein a lecithin material which, prior to use, has been chemically increased in reactivity or a lecithin-made water dispersible in other ways is used, and the resultant product of treating such lecithin material with a metal oxide mechanically without the application of heat is used to form a lecithin product which can be introduced into a pigmented water-based latex paint or other water-dispersed paint composition with the aim of obtaining in such water-based paint the ready ability of redispersion for such pigment composition, which might have settled due to their specific gravity during any period of paint storage.

9. Process as claimed in claim 1 wherein, for increasing the water-solubility and reactivity of the metal oxide, which is nearly or fully insoluble in water, such metal oxide is mechanically treated with a lecithin material without the requirement of application of heat.

10. Process as claimed in claim 9 wherein the increased water-solubility and reactivity of the lecithin-treated metal oxide is determined by the resultant increase of the simultaneous release of an organometal toxicant or other additive which had been a part of the pigment dispersion.

11. Process as claimed in claim 1 wherein the lecithin matter is obtained from plant seed.

12. Process as claimed in claim 11 wherein the plant lecithin is soybean lecithin, safflower lecithin or corn lecithin.

13. Process as claimed in claim 1 wherein the lecithin is a lecithin obtained from animal.

14. Process as claimed in claim 13 wherein the animal lecithin is egg lecithin.

15. Process as claimed in claim 1 wherein the lecithin used is a crude lecithin containing the oil-carrier fraction or is such separated fraction or is purified lecithin after separating it from the oil-carrier fraction.

16. Process as claimed in claim 15 wherein the purified lecithin is a so-called granular lecithin.

17. Process as claimed in claim 1 wherein the solid purified lecithin for the mechanical treatment with metal oxide is used with a volatile solvent or dispersant without requiring the addition of a triglyceride oil.

18. Process as claimed in claim 1 wherein the separated lecithin-treated metal oxide is dried, and when exposed in water or heated in water, results in a release of the metal complex into the water, whereafter such solution can then be utilized as a source of such metal components.

19. Process as claimed in claim 18 wherein water solutions containing the metal component or metal complex resulting from such processes which are subsequently produced and such reaction products in the water solution, are identified by electrodeposition analysis, whereby free metal ions are deposited by the electric current at the cathode and metal-lecithin complex matter are deposited at the anode and whereby the ratio of metal, which is in the solution in a free state to that which is in complexed form, is identified by means of said depositions.

20. Process as claimed in claim 1 wherein the metal oxide, which has been lecithin-treated, is separated from residual free lecithin and used as a corrosion-resistant additive to the paint.

21. Process as claimed in claim 1 wherein the metal oxide is based on a corrosion resistant metal selected from the group consisting of zinc, lead and tin oxides.

22. Process as claimed in claim 1 wherein the milling product resultant from the metal oxide and lecithin material, and without separating them from residual unreacted components, is used as an additive to the paint.

23. Process as claimed in claim 1 wherein the lecithin is first mixed with a solid or fluid wax of the group consisting of animal waxes and paraffin waxes, and the mixture is milled with a corrosion inhibiting metal oxide.

24. Process as claimed in claim 23 wherein the metal oxide is zinc oxide or lead oxide.

* * * * *